(12) United States Patent
Hanes (10) Patent No.: US 10,547,910 B2
(45) Date of Patent: Jan. 28, 2020

(54) ADJUSTING SPEAKER SETTINGS

(71) Applicant: Hewlett-Packard Development Company, L.P., Houston, TX (US)

(72) Inventor: David H. Hanes, Loveland, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/544,682

(22) PCT Filed: Apr. 17, 2015

(86) PCT No.: PCT/US2015/026521
§ 371 (c)(1),
(2) Date: Jul. 19, 2017

(87) PCT Pub. No.: WO2016/167812
PCT Pub. Date: Oct. 20, 2016

(65) Prior Publication Data
US 2017/0366865 A1 Dec. 21, 2017

(51) Int. Cl.
| | |
|---|---|
| *H04N 21/485* | (2011.01) |
| *H04N 21/4363* | (2011.01) |
| *H04N 21/81* | (2011.01) |
| *H04S 7/00* | (2006.01) |
| *H04L 29/08* | (2006.01) |

(52) U.S. Cl.
CPC ... *H04N 21/4852* (2013.01); *H04N 21/43637* (2013.01)

(58) Field of Classification Search
CPC ......... H04N 21/4852; H04N 21/43637; H04N 21/8106; H04S 7/30; H04L 67/306
USPC ........................................................ 700/94
See application file for complete search history.

(56) References Cited

U.S. PATENT DOCUMENTS

| | | | |
|---|---|---|---|
| 6,337,899 | B1 | 1/2002 | Alcendor et al. |
| 6,442,519 | B1 | 8/2002 | Kanevsky et al. |
| 6,530,083 | B1 | 3/2003 | Liebenow |
| 6,792,083 | B2 | 9/2004 | Dams et al. |
| 6,959,288 | B1 | 10/2005 | Medina et al. |
| 7,177,655 | B2 | 2/2007 | Lai et al. |
| 2005/0089177 | A1 | 4/2005 | Hughes |

(Continued)

FOREIGN PATENT DOCUMENTS

| | | |
|---|---|---|
| TW | 465209 | 11/2001 |
| TW | 200729028 | 8/2007 |

(Continued)

OTHER PUBLICATIONS

"Contents—SAM Broadcaster"; Feb. 6, 2011; 58 pages.

*Primary Examiner* — David L Ton
(74) *Attorney, Agent, or Firm* — HP Inc. Patent Department (57) ABSTRACT

Examples relate to a network-connected audio system for adjusting speaker settings. An example network-connected audio system may comprise a hardware processor that plays audio files. The example network-connected audio system may also comprise a user detection engine that detects that a first user is connected to the audio system, as well as a settings engine that determines that a first type of audio file is to be played, and changes audio settings of the audio system to a first set of audio settings responsive to determining that the first type of audio file is to be played and responsive to determining that the first user is connected to the audio system.

20 Claims, 2 Drawing Sheets

(56) References Cited

U.S. PATENT DOCUMENTS

| | | |
|---|---|---|
| 2008/0158000 A1 | 7/2008 | Mattrazzo |
| 2008/0175411 A1 | 7/2008 | Greve |
| 2009/0047993 A1 | 2/2009 | Vasa |
| 2009/0290725 A1 | 11/2009 | Huang |
| 2013/0096926 A1 | 4/2013 | Maling, III et al. |
| 2013/0128119 A1 | 5/2013 | Madathodiyil et al. |
| 2014/0003623 A1 | 1/2014 | Lang |
| 2014/0248036 A1 | 9/2014 | Saari et al. |

FOREIGN PATENT DOCUMENTS

| | | |
|---|---|---|
| TW | I352524 | 11/2011 |
| TW | I356722 | 1/2012 |
| TW | 201511579 | 3/2015 |
| TW | I475894 | 3/2015 |
| TW | I482505 | 4/2015 |
| WO | WO-02/100092 | 12/2002 |

ADJUSTING SPEAKER SETTINGS

BACKGROUND

Network connected audio systems may play audio files. The audio files to be played may be received from multiple sources and/or from multiple users connected to the network.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

Network connected audio systems may play audio files. Examples of a network connected audio system include a Bluetooth speaker, a WiFi connected speaker, and/or other audio device that receives information via a network and plays audio files. The audio files to be played may be received from multiple sources and/or from multiple users connected to the network. For examples, audio files may be received from local storage on a user's device, from a streaming music provider (e.g., PANDORA®, SPOTIFY®, and/or other streaming music service provider), from a cloud storage associated with a user connected to the network connected audio system, and/or from other sources. Upon receiving audio files, the network connected audio system may manage a queue of audio files to play.

The network connected audio system may consider audio settings of the audio system to play an audio file received. The audio settings may comprise multiple settings that affect the way in which the audio file is heard by the user. For example, the audio settings may comprise a volume setting, a set of equalizer settings, and/or other settings that affect the way in which the audio file is heard. The set of equalizer settings may comprise, for example, a bass setting, a treble setting, and/or other settings. In some examples, the set of equalizer settings may comprise a set of frequency values for a corresponding set of predetermined frequencies, such that each frequency value comprises a decibel level for the corresponding frequency.

As mentioned above, the network connected audio system may receive audio files across a network from these multiple sources and from multiple users. Each individual user that connects to the audio system to play music may have their own individual preferences regarding the audio files that are played. For example, a first user may like to listen to rock music with the bass higher than a second user, whereas a second user may prefer to consistently have a higher volume for audio files that are played.

To address this issue, the network connected audio system may change the audio settings of the audio system responsive to detecting that a specific user is connected to the audio system and responsive to determining that a specific type of audio file is to be played. In some examples, the network connected audio system may store a plurality of sets of audio settings, where each set of audio settings may correspond to a particular user and a particular type of audio file. As such, responsive to determining that the particular user is connected to the network connected audio system and the particular type of audio file is to be played, the audio system may change its audio settings to the corresponding set of audio settings and play the audio file using the corresponding set of audio settings.

The network connected audio system may adjust speaker settings in this manner for each detected user and each type of audio file it plays. In some examples, the network connected audio system may comprise a hardware processor that plays audio files, a user detection engine that detects that a particular user is connected to the audio system, and a settings engine that determines that a first type of audio file is to played and that changes the audio settings of the audio system to a set of audio settings corresponding to the detected user and the determined first type of audio file. The audio system may change the audio settings of the audio system to a second set of audio settings responsive to determining that a second type of audio file is to be played while the particular user is connected to the audio system. Similarly, the audio system may change the audio settings of the audio system responsive to detecting that a second user is connected to the audio system.

The network connected audio system may determine the set of audio settings that the audio system should use by accessing information stored in a storage communicably connected to the audio system. The storage may comprise a firmware file, a set of firmware files, and/or other stored data comprising the plurality of sets of audio settings. An individual set of audio settings may comprise information related to the user, information related to a type of audio file, information related to the audio settings at which the audio system should be playing the audio file, and/or other information related to customizing audio settings for the user and the type of audio file.

The network connected audio system may detect that a user is connected to the audio system by detecting that a device of the user is within a predetermined proximity of the audio system, by receiving information from a device indicating which user is to be detected, and/or based on other information received via the network. The network connected audio system may determine the particular type of audio file based on metadata associated with the audio file to be played, and/or based on other information related to the audio file to be played.

Figure 1:
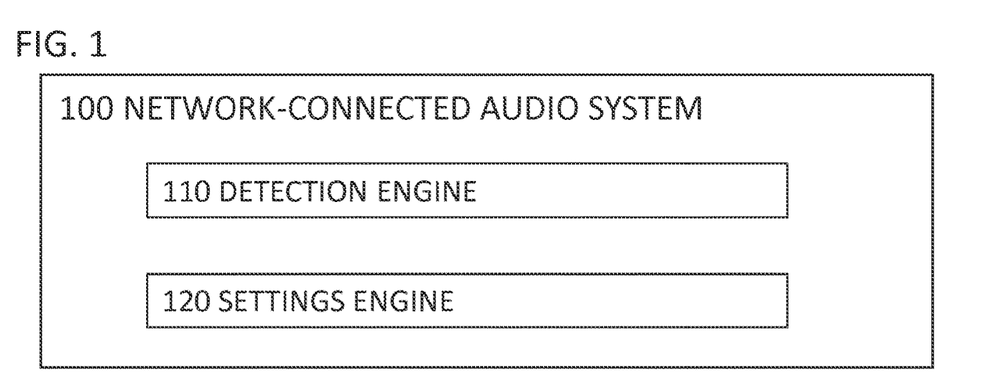
FIG. 1 is a depiction of an example network-connected audio system for adjusting speaker settings.

Referring now to the drawings, FIG. 1 is a block diagram of an example network connected audio system 100 for adjusting audio settings. The network connected audio system 100 may comprise a BLUETOOTH connected audio system, a WiFi connected audio system, or any other audio system suitable for executing the functionality described below. In the example depicted in FIG. 1, network connected audio system 100 includes a user detection engine 110, a settings engine 120, and/or other components for changing audio settings of the network connected audio system 100.

As detailed below, network connected audio system 100 may include a set of engines (e.g., user detection engine 110, settings engine 120, and/or other engines) for adjusting audio settings. Each of the engines may generally represent any combination of hardware and programming. For example, the programming for the engines may be processor executable instructions stored on a non-transitory machine-readable storage medium and the hardware for the engines may include at least one processor of the network connected audio system 100 to execute those instructions. In addition or as an alternative, each engine may include one or more hardware devices including electronic circuitry for implementing the functionality described below.

The processor of network connected audio system 100 may be one or more central processing units (CPUs), microprocessors, digital signal processors, and/or other hardware devices suitable for retrieval and execution of instructions stored in a machine-readable storage medium. The processor may fetch, decode, and execute program instructions to adjust audio settings of the network connected audio system 100, as described below. As an alternative or in addition to retrieving and executing instructions, the processor may include one or more electronic circuits comprising a number of electronic components for performing the functionality of instructions stored in the machine-readable storage medium.

In one example, the instructions can be part of an installation package that can be executed by the processor to implement the functionality described herein. In this case, the machine-readable storage medium may be a portable medium such as a CD, DVD, or flash drive or a memory maintained by a computing device from which the installation package can be downloaded and installed. In another example, the program instructions may be part of an application or applications already installed on network connected audio system 100.

The machine-readable storage medium may be any hardware storage device for maintaining data accessible to network connected audio system 100. For example, the machine-readable storage medium may include one or more hard disk drives, solid state drives, tape drives, and/or any other storage devices. The storage devices may be located in network connected audio system 100 and/or in another device in communication with network connected audio system 100. For example, the machine-readable storage medium may be any electronic, magnetic, optical, or other physical storage device that stores executable instructions. Thus, the machine-readable storage medium may be, for example, Random Access Memory (RAM), an Electrically-Erasable Programmable Read-Only Memory (EEPROM), a storage drive, an optical disc, and the like. As described in detail below, the machine-readable storage medium may be encoded with executable instructions for adjusting audio settings. As detailed below, the machine-readable storage medium may maintain and/or store the data and information described herein.

As mentioned above, network connected audio system 100 may also comprise a user detection engine 110.

The user detection engine 110 may detect that a user is connected to the network connected audio system 100. For example, the user detection engine 110 may detect that the user is connected to the audio system 100 by detecting a first device of the user within a predetermined proximity of the audio system 100. In another example, the user detection engine 110 may detect that the user is connected to the audio system 100 by receiving information from a device connected to the network connected audio system 100 (e.g., via near field communications, WiFi, Bluetooth, a wired connection, and/or other protocols). The information may comprise information related to the user to be connected to the network connected audio system 100. The device may be a device of the user or a device of another user.

In some examples, the user detection engine 110 may determine that multiple users are detected as being connected to the network connected audio system 100. For example, the user detection engine 110 may determine that multiple devices associated with respective multiple users are within a predetermined proximity of the audio system 100. In another example, the user detection engine 110 may receive multiple indications within a predetermined time period from one or more devices indicating that multiple users are connected to the audio system 100.

Responsive to determining that multiple users are detected as being connected to the network connected audio system 100, the user detection engine 110 may determine which user is detected as connected to the audio system 100 based on the audio file to be played, based on a priority of users stored in the audio system 100, based on recency of connection, and/or based on other factors.

In one example, the user detection engine 110 may determine that a first user of a set of users connected to the audio system 100 is detected as connected to the audio system 100 responsive to determining which user is associated with the audio file to be played next by the audio system 100.

In another example, the user detection engine 110 may determine that a first user of a set of users connected to the audio system 100 is detected as connected to the audio system 100 responsive to accessing information related to a priority of users, where the information may be stored in the machine-readable storage medium of the audio system 100. The information may comprise a hierarchy of users (e.g., ordered in terms of importance, priority, and/or other factors). The user detection engine 110 may determine that the first user is detected as connected to the audio system 100 based on the first user being highest in the hierarchy of users as compared to the other users of the multiple users connected to the audio system 100.

In another example, the user detection engine 110 may determine that a first user of a set of users connected to the audio system 100 is detected as connected to the audio system 100 responsive to determining that the first user was the most recent user of the multiple users to be connected to the audio system 100.

The user detection engine 110 may determine that a user is detected as connected to the audio system 100 in other manners as well and is not limited to the examples described herein.

In some examples, the machine-readable storage medium integral to the network connected audio system 100 may store information related to the audio settings, the users connected to the audio system 100, the users detected as connected to the audio system 100, the audio files received, the audio files to be played, the plurality of sets of audio settings, and/or any other information related to adjusting the audio settings of the network connected audio system 100.

The settings engine 120 may determine that a first type of audio file is to be played and may change audio settings of the network connected audio system 100 to a first set of audio settings responsive to determining that the first type of audio file is to be played and responsive to determining that a first user is connected to the audio system 100.

The settings engine 120 may determine that a first type of audio file is playing based on metadata associated with the file. For example, the metadata of an audio file may comprise information that indicates the type of the audio file. The information may be the audio file type, may comprise a code or other indicator related to an audio file type, and/or may comprise other information related to audio file type. In examples in which the metadata comprises a code or other indicator related to an audio file type, the settings engine 120 may cross-reference the information obtained from the metadata with audio file type information stored in the machine-readable storage medium to determine the type of the audio file.

The machine-readable storage medium of the network connected audio system 100 may comprise information related to a set of audio file types. For each type of audio file, the machine-readable storage medium may comprise an identifier of the type of audio file, a code or other indicator related to the type of audio file, information indicating a number of times an audio file of this type has been played, a default set of audio settings to be used with the type of audio file, any combination thereof, and/or other information related to the type of audio file.

The settings engine 120 may change the audio settings of the audio system 100 responsive to detecting a new user, responsive to determining that a new audio file is to be played, responsive to determining that a new type of audio file is to be played, and/or responsive to other factors as well.

The settings engine 120 may change the audio settings of the audio system 100 to a new set of audio settings by accessing information stored in the machine-readable storage medium. As mentioned above, the machine-readable storage medium of the network connected audio system 100 may comprise information related to the plurality of sets of audio settings. In some examples, the machine-readable storage medium may store a firmware file that may comprise the information related to the plurality of sets of audio settings. In some examples, the machine-readable storage medium may store a firmware file for each set of audio settings and may store information associated with each firmware file with a particular user and a particular type of audio file.

The settings engine 120 may access the information stored in the machine-readable storage medium to determine the new set of audio settings to be used. The settings engine 120 may determine the new set of audio settings by accessing the set of audio settings associated with the user detected as connected to the network connected audio system 100 and with the determined type of audio file.

The settings engine 120 may change the audio settings of the network connected audio system 100 to match the new set of audio settings and may cause the audio system 100 to play the audio file with the changed audio settings. In some examples, the settings engine 120 may change the audio settings of the network connected audio system 100 to match the new set of audio settings associated with the user detected as connected to the audio system 100, while the audio file to be played may have been received from a different user.

In some examples, the new set of audio settings may comprise information related to a subset of the audio settings of the network connected audio system 100. For example the new set of audio settings may only comprise information related to volume settings, a subset of equalizer settings, and/or another subset of the audio settings. In this example, the settings engine 120 may change the audio settings based on the information in the new audio settings related to the subset of the audio settings and may maintain values for the remainder of the audio settings of the network connected audio system 100.

In some examples, the settings engine 120 may determine that there is no new set of audio settings associated with the detected user and the determined type of audio file in the data stored in the machine-readable storage medium of the network connected audio system 100.

In these examples, the settings engine 120 may determine whether the machine-readable storage medium stores default settings for the detected person. Responsive to the settings engine 120 determining that the machine-readable storage medium stores default settings for the detected person, the settings engine 120 may change the audio settings of the audio system 100 to the default settings.

Responsive to determining that the machine-readable storage medium does not store default settings for the detected person, the settings engine 120 may determine whether the machine-readable storage medium stores default settings for the determined type of audio file. Responsive to the settings engine 120 determining that the machine-readable storage medium stores default settings for the determined type of audio file, the settings engine 120 may change the audio settings of the audio system 100 to the default settings.

Responsive to determining that the machine-readable storage medium does not store default settings for the determined type of audio file, the settings engine 120 may not change the audio settings of the network connected audio system 100. In another example, responsive to determining that the machine-readable storage medium does not store default settings for the determined type of audio file, the settings engine 120 may change the audio settings of the network connected audio system 100 to initial default settings.

In some examples, the settings engine 120 may manage a plurality of sets of audio settings, wherein each set of audio settings is associated with a respective user and a respective type of audio file. For example, responsive to detecting a user connected to the audio system 100, the settings engine 120 may determine whether the machine-readable storage medium stores any sets of audio settings associated with the user. Responsive to determining that the machine-readable storage medium does not store any sets of audio settings associated with the user, the settings engine 120 may query the user for information related to preferred audio settings for the type of audio file to be played, for a plurality of types of audio files that may be played by the audio system 100, and/or may otherwise obtain information from the user related to audio settings for the audio system 100. In some examples, the settings engine 120 may facilitate use of a wizard by the user to determine the sets of audio settings for the user.

In some examples, the settings engine 120 may periodically query the user to update the sets of audio settings associated with the user. The settings engine 120 may also change the sets of audio settings associated with user responsive to user interaction with the audio settings of the network connected audio system 100. The settings engine 120 may manage the plurality of sets of audio settings of the audio system 100 in other manners as well and is not limited to the examples described herein.

Figure 2:
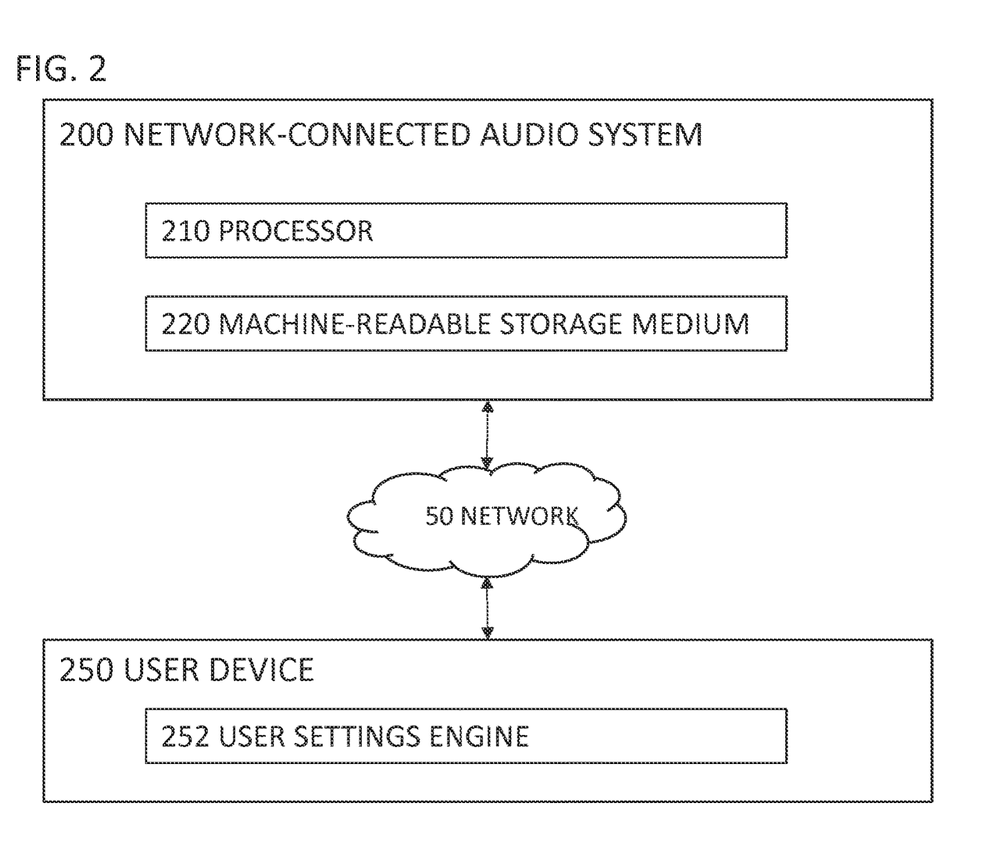
FIG. 2 is a depiction of an example system for adjusting speaker settings.

FIG. 2 depicts an example network connected audio system 200 for adjusting audio systems. As with network connected audio system 100, network connected audio system 200 may comprise a BLUETOOTH connected audio system, WiFi connected audio system, or any other network connected audio system suitable for executing the functionality described below. Network connected audio system 200 may comprise a processor 210, a machine-readable storage medium 220, and/or other components. As with the processor of network connected audio system 100, processor 210 may be one or more CPUs, microprocessors, digital signal processor, and/or other hardware devices suitable for retrieval and execution of instructions. As with the storage medium of network connected audio system 100, the machine-readable storage medium 220 of network connected audio system 200 may be any hardware storage device for maintaining data accessible to network connected audio system 200 and may comprise information similar to that stored in the machine-readable storage medium of network connected audio system 100.

The processor 210 of network connected audio system 200 may execute computer readable instructions stored in the machine-readable storage medium 220 of network connected audio system 200. The processor 210 may execute the computer readable instructions to perform functionality the same as or similar to the functionality performed by the user detection engine 110, settings engine 120, and/or other components of the network connected audio system 100.

For example, processor 210 of network connected audio system 200 may execute computer readable instructions stored in the machine-readable storage medium 220 to detect that a first user is connected to the audio system 200, manage a plurality of sets of audio settings, wherein each set of audio settings is associated with a respective user and a respective type of audio file, determine that a first audio file is to be played, determine a first type of the audio file, change audio settings of the audio system 200 to a first set of audio settings of the plurality of sets of audio settings responsive to determining that the first type of audio file is to be played and responsive to determining that the first user is connected to the audio system 200, and play the first audio file at the first set of audio settings.

Network connected audio system 200 may also be communicably coupled to one or more user devices 250.

A user device 250 may comprise, for example, a laptop computing device, a desktop computing device, an all-in-one computing device, a tablet computing device, a mobile phone, an electronic book reader, a network-enabled appliance such as a "Smart" television, a server, and/or other electronic device suitable for executing the functionality described below. An individual user device 250 may be coupled to network connected audio system 200 via a network 50. The network 50 may be any suitable network for facilitating communication between the device 250 and the audio system 200.

In the example depicted in FIG. 2, device 250 includes a user settings engine 252, and/or other components.

As detailed below, device 250 may include a set of engines (e.g., user settings engine 252, etc.). Each of the engines may generally represent any combination of hardware and programming. For example, the programming for the engines may be processor executable instructions stored on a non-transitory machine-readable storage medium 220 and the hardware for the engines may include at least one processor of the device 250 to execute those instructions. In addition or as an alternative, each engine may include one or more hardware devices including electronic circuitry for implementing the functionality described below. While functionality may be ascribed to a particular engine, one or more engines of the device 250 may perform that functionality.

The processor of device 250 may be one or more central processing units (CPUs), microprocessors, and/or other hardware devices suitable for retrieval and execution of instructions stored in a machine-readable storage medium. The processor may fetch, decode, and execute program instructions to perform the functionality described herein, as described below. As an alternative or in addition to retrieving and executing instructions, the processor may include one or more electronic circuits comprising a number of electronic components for performing the functionality of instructions stored in the machine-readable storage medium.

In one example, the instructions can be part of an installation package that can be executed by the processor to implement the functionality described herein. In this case, the machine-readable storage medium may be a portable medium such as a CD, DVD, or flash drive or a memory maintained by a computing device from which the installation package can be downloaded and installed. In another example, the program instructions may be part of an application or applications already installed on device 250.

The machine-readable storage medium may be any hardware storage device for maintaining data accessible to device 250. For example, the machine-readable storage medium may include one or more hard disk drives, solid state drives, tape drives, and/or any other storage devices. The storage devices may be located in device 250 and/or in another device in communication with device 250. For example, the machine-readable storage medium may be any electronic, magnetic, optical, or other physical storage device that stores executable instructions. Thus, the machine-readable storage medium may be, for example, Random Access Memory (RAM), an Electrically-Erasable Programmable Read-Only Memory (EEPROM), a storage drive, an optical disc, and the like. As described in detail below, the machine-readable storage medium may be encoded with executable instructions. As detailed below, the machine-readable storage medium may maintain and/or store the data and information described herein.

The user device 250 may provide audio files and/or information related to audio files to be played by the network connected audio system 200, may provide information to connect the device to the network 50 to facilitate connection with the audio system 200, may provide information to directly connect to the audio system 200, may provide information about the user's audio settings preferences, and/or may otherwise interact with the audio system 200.

User settings engine 252 may facilitate detection of a user by the network connected audio system 200 (e.g., as described above). The user settings engine 252 may provide information about the user connected to the network connected audio system 200.

Figure 3:
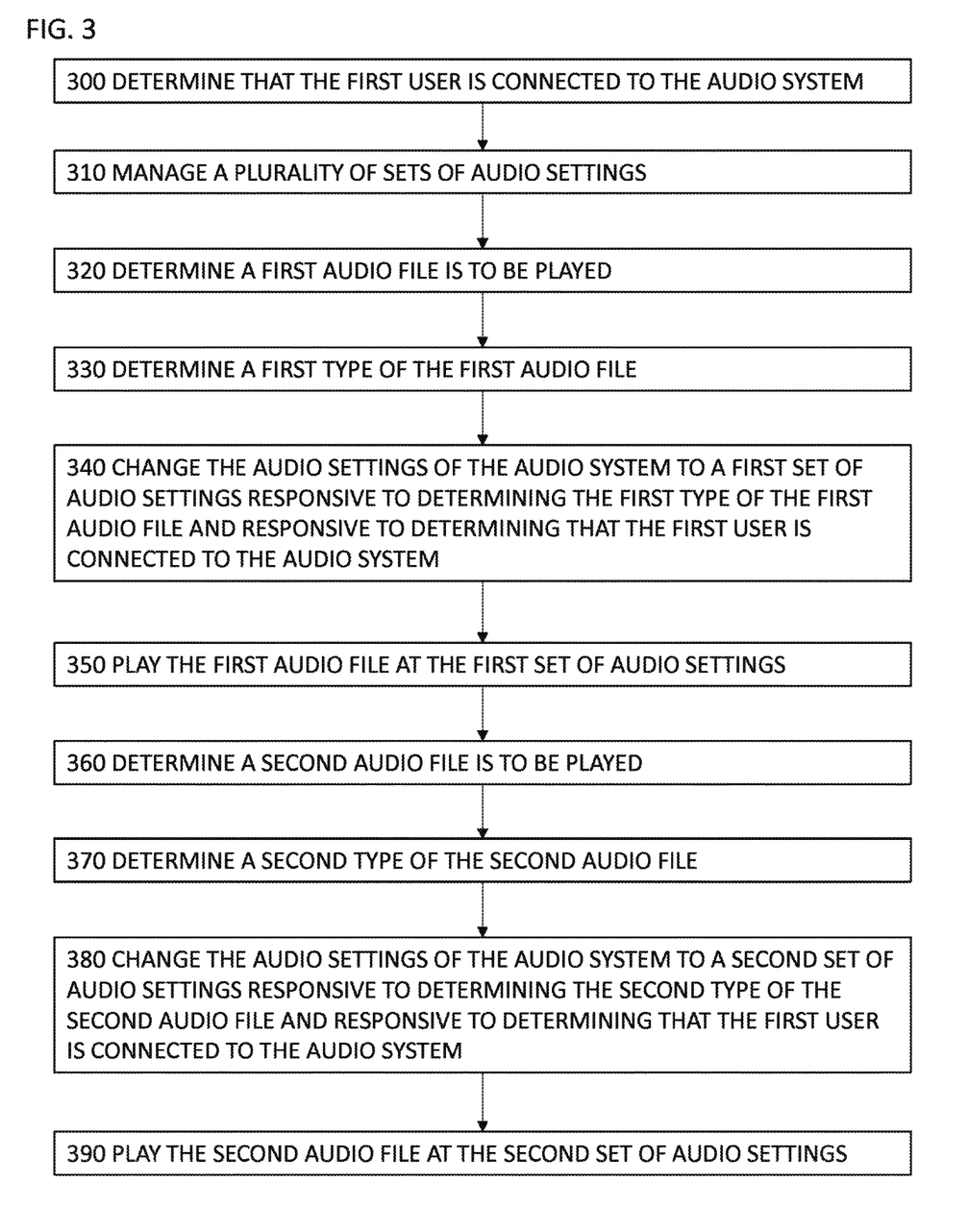
FIG. 3 is a depiction of an example method for adjusting speaker settings.

FIG. 3 is a flowchart of an example method for execution by a system for adjusting audio settings.

Although execution of the method described below is with reference to network connected audio systems 100 and 200 of FIGS. 1 and 2, other suitable devices for execution of this method will be apparent to those of skill in the art. The method described in FIG. 3 and other figures may be implemented in the form of executable instructions stored on a machine-readable storage medium, by one or more engines described herein, and/or in the form of electronic circuitry.

In an operation 300, the network-connected audio system may detect that a first user is connected to the audio system. For example, the network connected audio system 100 (and/or the user detection engine 110, processor, or other resource of the network connected audio system 100) may detect that the first user is connected to the audio system. The network connected audio system 100 may detect that the first user is connected to the audio system in a manner similar or the same as that described above in relation to the execution of the user detection engine 110, processor, or other resource of the network connected audio system 100.

In an operation 310, the network-connected audio system may manage a plurality of sets of audio settings, wherein each set of audio settings is associated with a respective user and a respective type of audio file. For example, the network connected audio system 100 (and/or the settings engine 120, processor, or other resource of the network connected audio system 100) may manage the plurality of sets of audio settings. The network connected audio system 100 may manage the plurality of sets of audio settings in a manner similar or the same as that described above in relation to the execution of the settings engine 120, processor, or other resource of the network connected audio system 100.

In an operation 320, the network-connected audio system may determine that a first audio file is to be played. For example, the network connected audio system 100 (and/or the settings engine 120, processor, or other resource of the network connected audio system 100) may determine that a first audio file is to be played. The network connected audio system 100 may determine that a first audio file is to be played in a manner similar or the same as that described above in relation to the execution of the settings engine 120, processor, or other resource of the network connected audio system 100.

In an operation 330, the network-connected audio system may determine a first type of the audio file. For example, the network connected audio system 100 (and/or the settings engine 120, processor, or other resource of the network connected audio system 100) may determine a first type of the audio file. The network connected audio system 100 may determine a first type of the audio file in a manner similar or the same as that described above in relation to the execution of the settings engine 120, processor, or other resource of the network connected audio system 100.

In an operation 340, the network-connected audio system may change audio settings of the audio system to a first set of audio settings of the plurality of sets of audio settings responsive to determining that the first type of audio file is to be played and responsive to determining that the first user is connected to the audio system. For example, the network connected audio system 100 (and/or the settings engine 120, processor, or other resource of the network connected audio system 100) may change the audio settings. The network connected audio system 100 may change the audio settings to be played in a manner similar or the same as that described above in relation to the execution of the settings engine 120, processor, or other resource of the network connected audio system 100.

In an operation 350, the network-connected audio system may play the first audio file at the first set of audio settings. For example, the network connected audio system 100 (and/or the settings engine 120, processor, or other resource of the network connected audio system 100) may play the first audio file. The network connected audio system 100 may play the first audio file in a manner similar or the same as that described above in relation to the execution of the settings engine 120, processor, or other resource of the network connected audio system 100.

In an operation 360, the network-connected audio system may determine that a second audio file is to be played. For example, the network connected audio system 100 (and/or the settings engine 120, processor, or other resource of the network connected audio system 100) may determine that a second audio file is to be played. The network connected audio system 100 may determine that a second audio file is to be played in a manner similar or the same as that described above in relation to the execution of the settings engine 120, processor, or other resource of the network connected audio system 100.

In an operation 370, the network-connected audio system may determine a second type of the audio file. For example, the network connected audio system 100 (and/or the settings engine 120, processor, or other resource of the network connected audio system 100) may determine a second type of the audio file. The network connected audio system 100 may determine a second type of the audio file in a manner similar or the same as that described above in relation to the execution of the settings engine 120, processor, or other resource of the network connected audio system 100.

In an operation 380, the network-connected audio system may change audio settings of the audio system to a second set of audio settings of the plurality of sets of audio settings responsive to determining that the second type of audio file is to be played and responsive to determining that the first user is connected to the audio system. For example, the network connected audio system 100 (and/or the settings engine 120, processor, or other resource of the network connected audio system 100) may change the audio settings. The network connected audio system 100 may change the audio settings to be played in a manner similar or the same as that described above in relation to the execution of the settings engine 120, processor, or other resource of the network connected audio system 100.

In an operation 390, the network-connected audio system may play the second audio file at the second set of audio settings. For example, the network connected audio system 100 (and/or the settings engine 120, processor, or other resource of the network connected audio system 100) may play the second audio file. The network connected audio system 100 may play the second audio file in a manner similar or the same as that described above in relation to the execution of the settings engine 120, processor, or other resource of the network connected audio system 100.

The foregoing disclosure describes a number of examples of an audio system for changing audio settings. For purposes of explanation, certain examples are described with reference to the components illustrated in FIGS. 1-3. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-3 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

I claim:

1. An audio system for adjusting speaker settings, the audio system comprising:
 a circuit comprising a programmed hardware processor, the circuit to cause audio files to play; and
 a user detection engine, implemented by the circuit, to:
  detect a plurality of users that have connected to the audio system, and from among the plurality of users, select a first user that is connected to the audio system from the plurality of users that have connected to the audio system;

a settings engine, implemented by the circuit, to:
determine that a first type of audio file is to be played; and
change audio settings of the audio system to a first set of audio settings responsive to a determination that the first type of audio file is to be played and responsive to selection of the first user that is connected to the audio system, the first set of audio settings being associated in memory of the circuit as preferences of the first user for the first type of audio file.

2. The audio system of claim 1, wherein the settings engine:
determines that a second type of audio file is to be played; and
changes the audio settings of the audio system to a second set of audio settings responsive to determining that the second type of audio file is to be played and responsive to determining that the first user is connected to the audio system.

3. The audio system of claim 1, wherein the user detection engine detects that a second user is connected to the audio system; and
wherein the settings engine:
determines that a second type of audio file is to be played; and
changes the audio settings of the audio system to a second set of audio settings responsive to determining that the second type of audio file is to be played and responsive to determining that the second user is connected to the audio system.

4. The audio system of claim 1, wherein the user detection engine detects that the first user is connected to the audio system by detecting a first device of the first user within a predetermined proximity of the audio system.

5. The audio system of claim 1, wherein the audio settings comprise a volume setting and a set of equalizer settings, and wherein the settings engine changes the audio settings to the first set of audio settings by adjusting a subset of the set of equalizer settings.

6. The audio system of claim 1, wherein the settings engine determines the first type of the first audio file based on metadata associated with the first audio file.

7. The audio system of claim 1, wherein the user detection engine identifies the first user as that user, from among a plurality of users, whose device most recently accessed the audio system.

8. The audio system of claim 1, wherein the user detection engine identifies the first user as that user whose device is connected to the audio system and who has a highest priority in a hierarchy of the plurality of users.

9. An audio system for adjusting speaker settings, the audio system comprising:
a processor implementing machine-readable instructions to cause the audio system to:
detect that a first user is connected to the audio system;
manage a plurality of sets of audio settings, wherein each set of audio settings is associated with a respective user and a respective type of audio file;
identify a first set of audio settings that are associated with the first user from a plurality of sets of audio settings corresponding to users that have connected to the audio system;
determine that a first audio file is to be played;
determine a first type of audio file corresponding to the first audio file;
change audio settings of the audio system to the first set of audio settings of the plurality of sets of audio settings responsive to a determination that the first type of audio file is to be played and responsive to a determination that the first user is connected to the audio system; and
play the first audio file at the first set of audio settings.

10. The audio system of claim 9, wherein the processor implements machine-readable instructions that cause the audio system to:
determine that a second audio file is to be played;
determine a second type of the second audio file; and
change the audio settings of the audio system to a second set of audio settings of the plurality of sets of audio settings responsive to a determination that the second type of audio file is to be played and responsive to a determination that the first user is connected to the audio system; and play the second audio file at the second set of audio settings.

11. The audio system of claim 9, wherein the processor implements machine-readable instructions that cause the audio system to:
detect that a second user is connected to the audio system;
determine that a third audio file is to be played;
determine a third type of the third audio file;
change the audio settings of the audio system to a third set of audio settings of the plurality of sets of audio settings responsive to determining that the third type of audio file is to be played and responsive to determining that the second user is connected to the audio system; and
play the third audio file at the third set of audio settings.

12. The audio system of claim 9, wherein the processor implements machine-readable instructions that cause the audio system to:
detect that the first user is connected to the audio system by receiving information from a first device indicating which user is connected to the audio system.

13. The audio system of claim 12, wherein the processor implements machine-readable instructions that cause the audio system to:
determine the first type of the first audio file based on metadata associated with the first audio file.

14. The audio system of claim 9, wherein the processor is to apply default audio settings associated with the first user when the first type of audio file is not associated with audio settings for the first user.

15. The audio system of claim 14, wherein the processor is to apply default audio settings associated with the first type of audio file when there are no default audio settings associated with the first user and the first type of audio file is not associated with audio settings for the first user.

16. The audio system of claim 9, wherein the processor is programmed to cause the audio system to periodically query a selected user to update the audio settings associated with that user.

17. A method for adjusting speaker settings of a network-connected audio system, the method comprising:
detecting, by the network-connected audio system, a plurality of users that are connected to the audio system and, from among the plurality of users, selecting a first user that is connected to the audio system;
managing, by the network-connected audio system, a plurality of sets of audio settings, wherein each set of audio settings is associated with a respective user and a respective type of audio file;

determining, by the network-connected audio system, that a first audio file is to be played;

determining, by the network-connected audio system, a first type of the audio file;

changing, by the network-connected audio system, audio settings of the audio system to a first set of audio settings of the plurality of sets of audio settings responsive to determining that the first type of audio file is to be played and responsive to selecting the first user from among the plurality of users connected to the audio system;

playing, by the network-connected audio system, the first audio file at the first set of audio settings;

determining, by the network-connected audio system, that a second audio file is to be played;

determining, by the network-connected audio system, a second type of the second file; and changing, by the network-connected audio system, audio settings of the audio system to a second set of audio settings of the plurality of sets of audio settings responsive to determining that the second type of audio file is to be played; and playing, by the network-connected audio system, the second audio file at the second set of audio settings.

18. The method of claim 17, further comprising:

detecting, by the network-connected audio system, that a second user is connected to the audio system, where the second user takes precedence over the first user in the audio system;

determining, by the network-connected audio system, that a third audio file is to be played;

determining, by the network-connected audio system, a third type of the third audio file;

changing, by the network-connected audio system, the audio settings of the audio system to a third set of audio settings of the plurality of sets of audio settings responsive to determining that the third type of audio file is to be played and responsive to determining that the second user takes precedence in the audio system; and playing, by the network-connected audio system, the third audio file at the third set of audio settings.

19. The method of claim 17, further comprising:

determining, by the network-connected audio system, the first type of the first audio file based on metadata associated with the first audio file.

20. The method of claim 17, wherein the first user is detected as being connected to the audio system by:

receiving, by the network-connected audio system, information from a first device indicating that the first user is connected to the audio system.

* * * * *